Jan. 11, 1966     E. C. GREANIAS     3,229,100
ELECTRONIC SERVO SYSTEM
Filed Dec. 31, 1962     7 Sheets-Sheet 1

INVENTOR
EVON C. GREANIAS
BY Robert E. Sandt
AGENT

Jan. 11, 1966  E. C. GREANIAS  3,229,100
ELECTRONIC SERVO SYSTEM
Filed Dec. 31, 1962  7 Sheets-Sheet 2

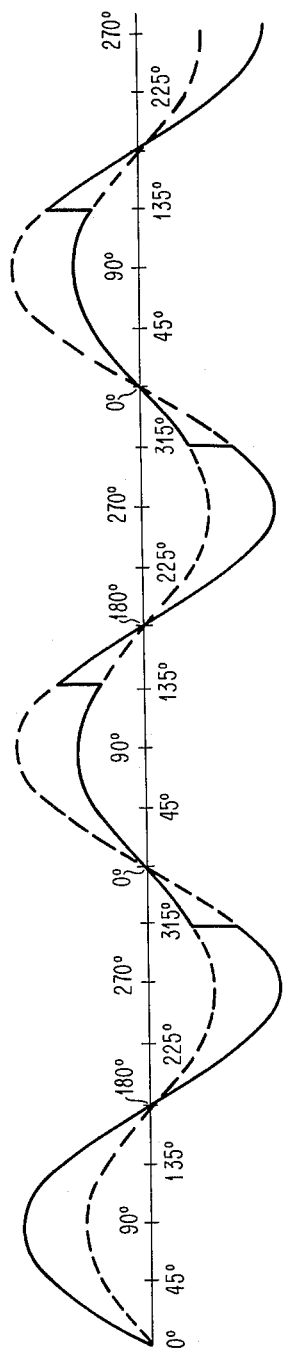
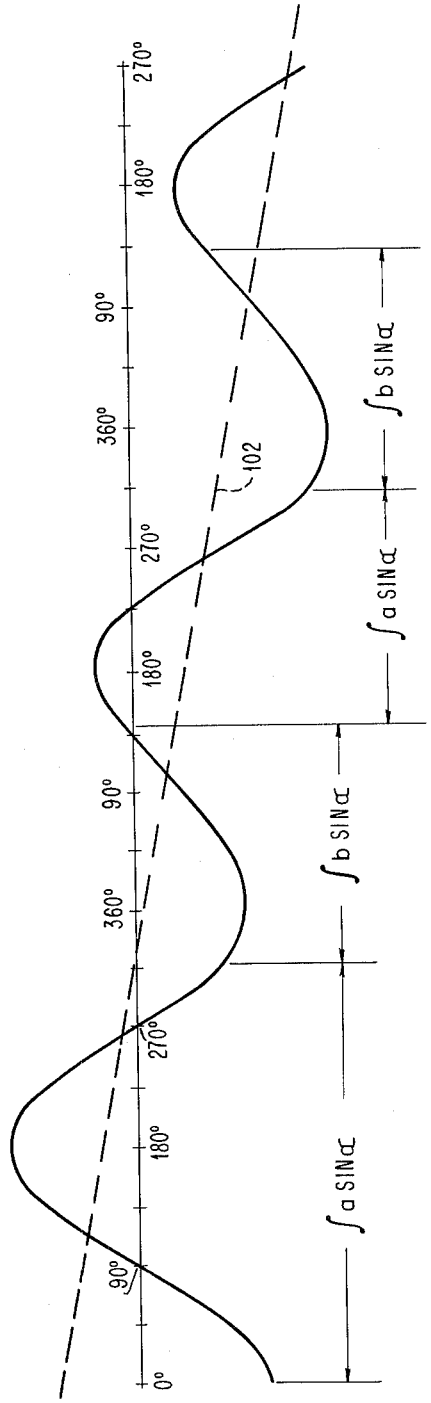
FIG. 1D
FIG. 1E

Jan. 11, 1966  E. C. GREANIAS  3,229,100
ELECTRONIC SERVO SYSTEM

Filed Dec. 31, 1962  7 Sheets-Sheet 5

Jan. 11, 1966 E. C. GREANIAS 3,229,100
ELECTRONIC SERVO SYSTEM
Filed Dec. 31, 1962 7 Sheets-Sheet 6

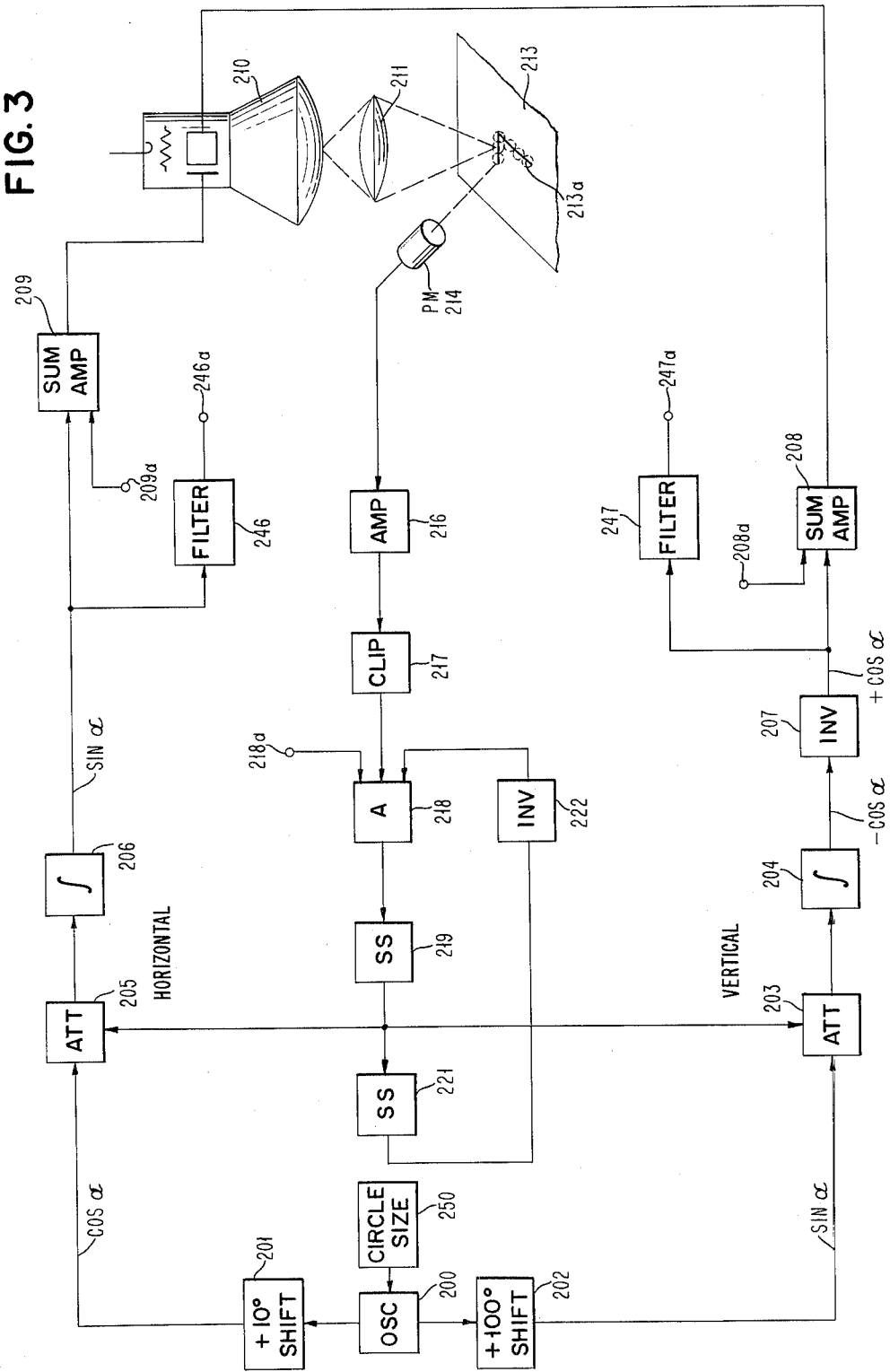

United States Patent Office 3,229,100
Patented Jan. 11, 1966

3,229,100
ELECTRONIC SERVO SYSTEM
Evon C. Greanias, Chappaqua, N.Y., assignor to International Business Machines Corporation, New York, N.Y., a corporation of New York
Filed Dec. 31, 1962, Ser. No. 248,585
9 Claims. (Cl. 250—202)

This invention relates to electronic servo systems, and more particularly to an electronic curve follower for following the contour of line patterns.

In optical pattern recognition systems, the handwritten or printed character is scanned with a moving beam of light and the intensity changes in the transmitted or reflected light referenced to the scanning pattern to provide video signals definitive of the shape of the character. By suitably processing these signals in a recognition circuit, the identity of the character thus scanned is manifested by some discrete signal output which can then be utilized, for example, as an input to a data processing system. Since the character of the video signals is obviously a function of the scanning pattern, it is desirable to choose a pattern which yields the maximum utilizable information. Any predetermined fixed scanning pattern, such as the conventional raster scan, must necessarily be a compromise. A scanning pattern having a specific configuration for each different character to be identified, therefore, would make possible accommodations for varying sizes, orientations, and styles of characters, and to provide the maximum of information. Since the identity of a character is not known in advance, it is obvious that the scanning pattern cannot be preordained. Therefore, the logical method of operation is to permit the configuration of the character itself to control the scanning pattern. This then, leads to a curve follower type of operation wherein a moving light beam, or moving field of view (the converse), is caused to trace out the shape of the character, and yield time variant signals suitable for analysis by the recognition circuits.

It is, therefore, an object of this invention to provide a curve following apparatus particularly suited for producing time variant analog signals which are a function of the configuration of the pattern or curve being traced, such that these signals may be analyzed to identity the shape of the pattern.

A further object of this invention is to achieve the curve following operation in accordance with the foregoing object by providing apparatus to alternately integrate two constant waveforms, and to control the proportions of the waveforms integrated by the incidence of the tracing medium upon the curve to be traced.

Yet another object is to provide an optical pattern following apparatus in which the deflection potentials for controlling the deflection of a cathode ray tube scanning beam are derived from the alternate integration of sine and cosine waveforms of two different amplitudes, the proportion of the greater amplitude waveform selected for integration being controlled by the incidence of the cathode ray tube scanning beam on the pattern whose outline is to be traced.

The foregoing and other objects, features and advantages of the invention will be apparent from the following more particular description of preferred embodiments of the invention, as illustrated in the accompanying drawings.

FIGS. 1B through 1I are graphical representations explaining the mathematical theory of operation of the apparatus of FIG. 1.

FIG. 3 is a schematic circuit diagram of an actual circuit for performing the functions of the apparatus of FIG. 1.

Figure 1:
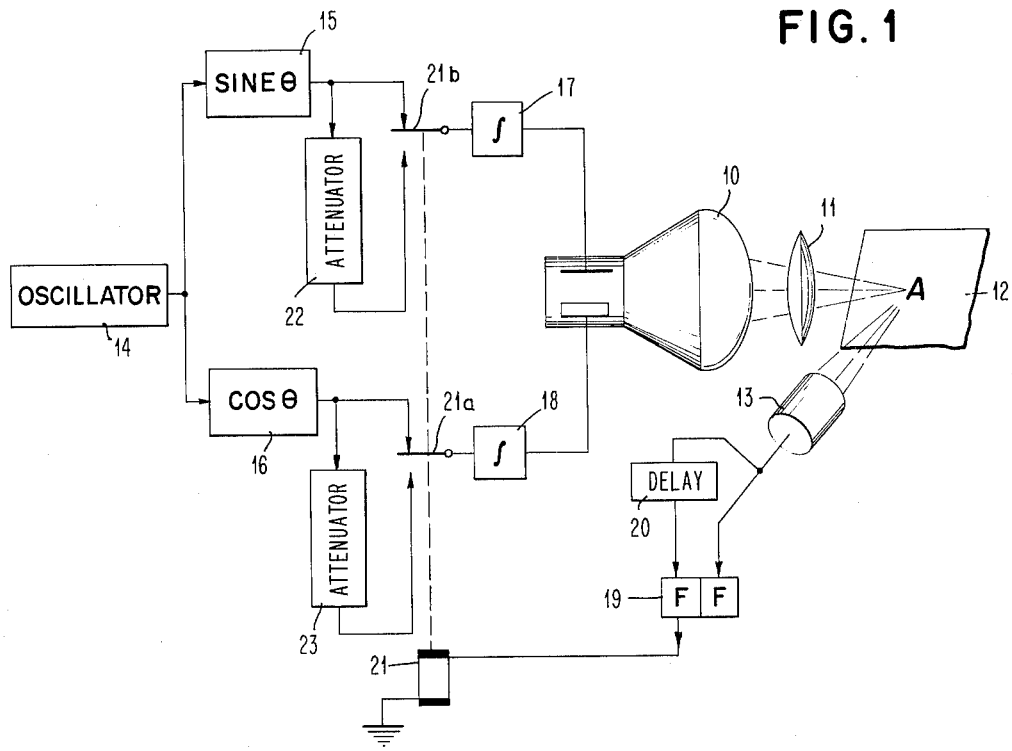
FIG. 1 is a schematic showing of the essential elements of a curve follower operating in accordance with the principles of this invention.
Figure 2:
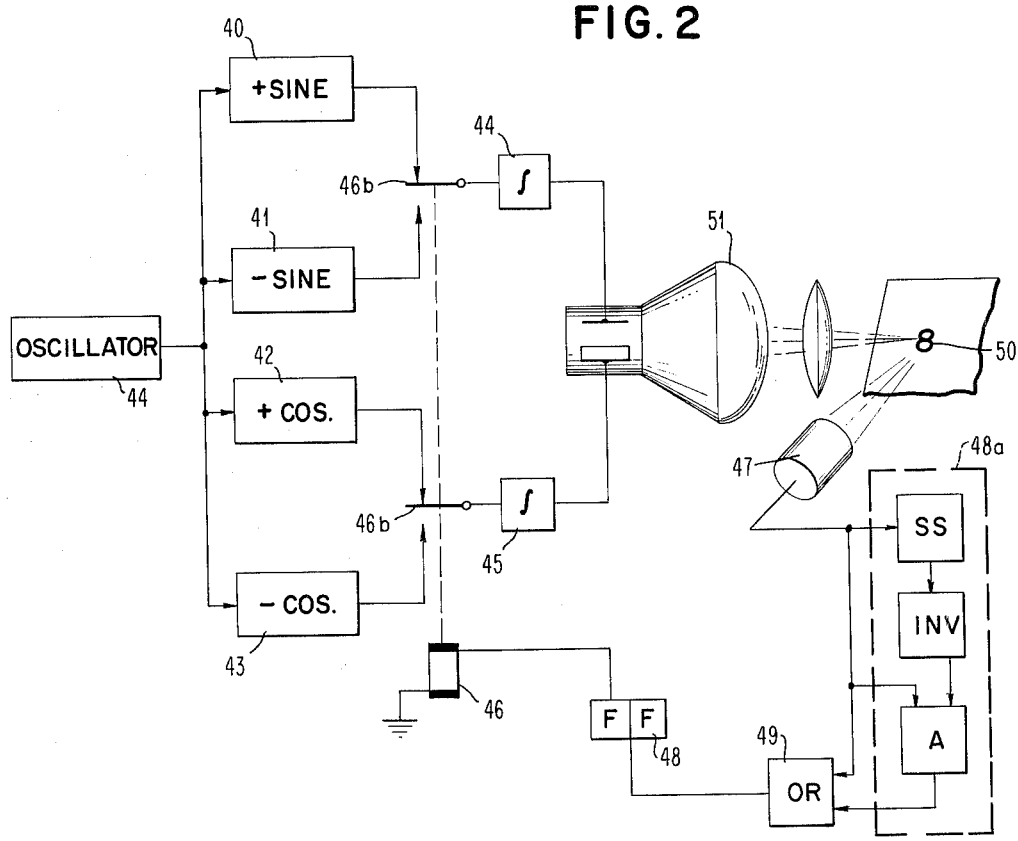
FIG. 2 is a modification of the apparatus of FIG. 1.

In FIGS. 1 and 2, two embodiments of a curve follower apparatus are illustrated through use of functional blocks which illustrate the principle of the mode of operation. Common to both of these structures are two separate sources of invariant waveforms and a switching means controlled by the impingement of the scanning beam on the pattern to be identified for selecting the waveform source. Not only does the alternate selection of these waveform sources provide the necessary dither to the scanning beam, but also the relative time that each waveform source is connected provides the necessary gross migration of the scanning beam to follow the pattern.

Specifically, in FIG. 1, the controlled spot of light from a cathode ray tube 10 is focused by suitable optics 11 to illuminate a document or photo transparency 12 and the transmitted or reflected light detected by a photo responsive device 13. Ignoring for the moment such devices as clippers, etc., it is assumed for purposes of a schematic explanation that every time that the scanning beam is interrupted by the curve, or pattern, whose outline is to be traced or followed, that a control pulse becomes available. Assuming that the circuit elements occupy the status shown in FIG. 1, the oscillator 14 controls the sine wave generator 15 and the cosine wave generator 16 to produce two sinusoidal waveforms of equal amplitude and displaced 90° from another. These waveforms are integrated respectively in the X integrator 17 and Y integrator 18, the outputs from which are connected to the X and Y deflection control circuits of the cathode ray tube 10. As is well known in integral calculus, the integral sin $\alpha$ is $-\cos \alpha$, and the integral of cos $\alpha$ is sine $\alpha$. The outputs of the integrators 17 and 18, when connected to the deflection circuits of the cathode ray tube 10 will cause the electron beam to trace a circular path rotating clockwise. Absent any further controls, the beam would continue this circular path about a fixed point without any migration, as each positive loop of both the sine wave and the cosine wave is balanced by a negative loop of equal area. The integrated output from the X and Y integrators for each 360° will, therefore, be zero, and the beam will move only in its circular dither pattern. However, as was alluded to previously, when this circular trace is focused on the document 12 and intersects an opaque line pattern, a control pulse is produced by the photo-responsive device 13. This control pulse switches the state of the flip-flop 19 and also enters the delay circuit 20. When the flip-flop 19 is thus switched, the relay 21 (actually an electronic circuit equivalent) is energized to transfer its associated switch points 21a and 21b (again the electronic equivalent would be employed) to connect the inputs of the X integrator 17 and the Y integrator 18 to the sine wave generator 15 and cosine wave generator 16 through the respective attenuators 22 and 23, which do not alter the phase or timing of the waveforms, but merely reduce the amplitudes thereof by a constant factor. This attenuation of the basic waveforms continues until the pulse entering the delay device appears at its output to return the flip-flop to its former state, release the relay 21 and reconnect the X and Y integrators to the unattenuated sine and cosine waveforms. The delay time of the delay device is fixed, and for the purpose of this explanation, is taken to be equal to 180° of beam time, or ½ the period of the oscillator 14. Thus, the attenuated waveform will be connected to the integrators 17 and 18 for 180° of beam time, while the unattenuated waveform is applied for a variable period of time, depending solely on the direction of the curve being traced.

Figure 1A:
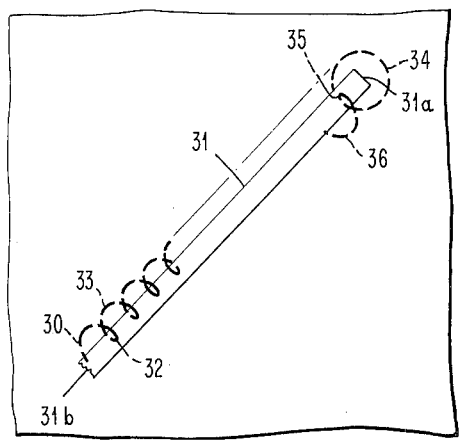
Fig. 1A is a typical trace of the beam controlled by the apparatus of FIG. 1.

If, as in FIG. 1A, it is assumed that the cathode ray tube scanning beam is initially positioned adjacent to the line 31, the beam is then capable of intersection the line 31. Neglecting for the moment, the mathematics of the integration, and assuming that the tracing beam rotates clockwise from the negative X axis as a reference under the influence of attenuated or unattenuated phased sine and cosine waveforms, it will be apparent that the beam will trace a circular path having either a large or small radius, depending on the amplitudes of the connected waveforms. If the line 31 slopes 45° upward to the right, as shown, and the beam is influenced by the unattenuated waveforms, then the large circular trace 30 will intersect the line 31 at 135° of beam time causing (as previously explained) a switch to the attenuated waveform for 180° (from 135° to 315°) to trace the small semi-circle 32. At 315° the beam control switches to the greater waveforms to trace the semi-circle 33, which terminates at 135° in the second cycle. This alternation between the large and small circles continues and the beam traces along the line 31 until the end 31a thereof is encountered. If at this time it is assumed that the beam is tracing the circular path 34, the line end prevents intersection until 315° of beam time. The switch to the smaller circle 35 now occurs and prevails until 135° of beam time, when the switch back to the large circle 36 occurs. The beam will now trace along the lower side of the line 31, downward and to the left until the line end 31b is encountered. The switching times will now revert to the original schedule (from large to small at 135° and from small to large at 315° of beam time), and the beam will continue following around the line 31.

Returning now to the mathematics of the integrator action, it should be recalled that the integrators 17 and 18 receive inputs of sin α and cos α respectively, having one of two different amplitudes, (a the greater, and b the lesser). Since the integral of a sin α is −a cos α, the output from the X integrator will be −a at 0° of beam time. Similarly, since the integral of a cos α is +a sin α, the output of the Y integrator 18 will be 0 at 0° of beam time. This relationship, therefore, gives credence, to the previous statement that the reference zero for the beam lies on the negative X axis. At 90° of beam time, the integrated output of integrator 17 is again −a cos α, but cos α is now 0 so that the X displacement is zero. The Y displacement is α sine β, or a, for sin α=1, when α=90°. The beam at 90° of beam time will, therefore, lie on the Y—Y axis with a positive value of Y=α, thus substantiating the clockwise rotation, previously stated. Other directions of rotation and zero references could obviously be effected by interchanging the X and Y deflection circuit connections, or by inverting the sign of one of the input junctions. So also would the choice of optics effect the axis of reference. However, for purposes of this simplified study of the schematic operation, the convention established above will be embraced, viz clockwise rotation from the negative X axis as a reference.

With the foregoing conventions, the beam in following the upper slope of the line 31 in FIG. 1A switches from the unattenuated waveform to the attenuated waveform at 135° of beam time and effects the converse switch 180° later at 315° of beam time. This switch is graphically shown in FIG. 1B wherein that sine waveform connected to the X integrator 17 is shown as a solid line and the disconnected waveform shown dotted. It will be noted that the a sin α waveform has the greater amplitude and is solid from 315° to 135°, while, during the same time period the lesser amplitude b sin α waveform is dotted. From 135° to 315° the reverse situation obtains, with a sin α dotted and b sin α full. The same convention is employed in FIG. 1F which shows the a cos α and b cos α waveform inputs to the Y integrator 18.

Figure 1B:
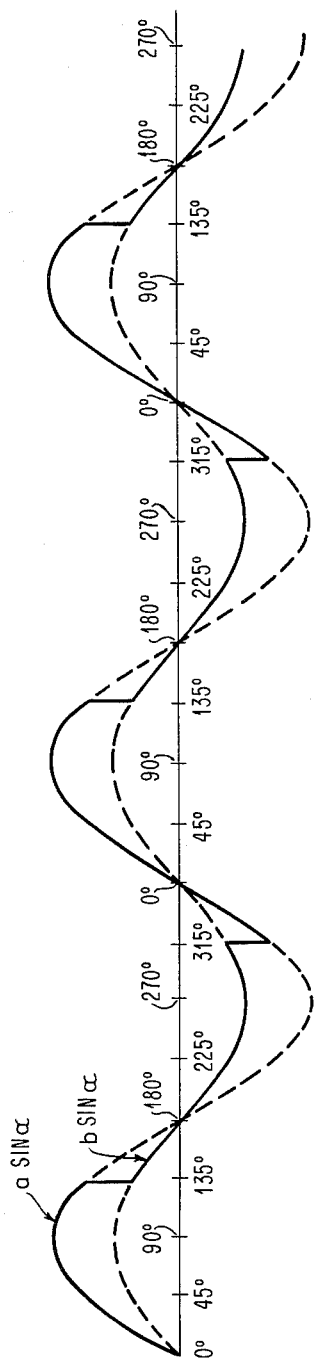
Figure 1C:
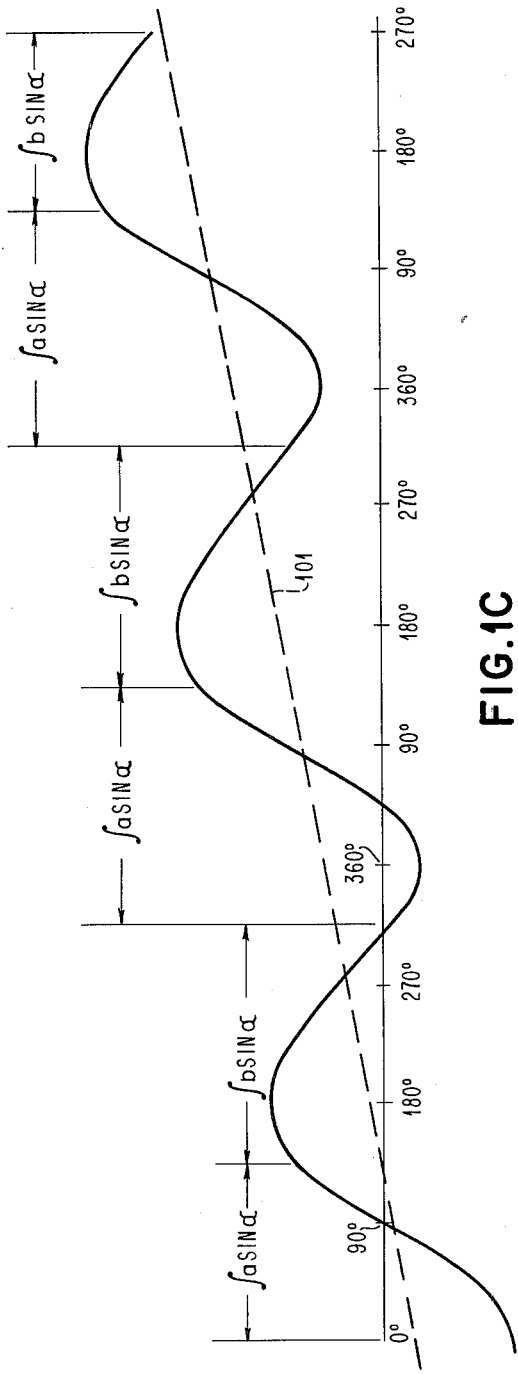

With the inputs to the X integrator 17 as shown in FIG. 1B, and explained above, the integrated output waveform, which is applied to the X deflection plates of the cathode ray tube, is shown in FIG. 1C. It will be noted that the X potential is generally increasing, as would be expected for a gross migration of the beam upward and to the right, while following the upper surface of the line 31 of FIG. 1A. This positive gross movement in the X direction can be qualitatively appreciated from FIG. 1B, where it will be seen that the areas under the positive portions of the waveforms are greater than those under the negative portions of the connected waveforms. Since integration is area summing, it follows that the sum of the areas must produce an ever increasing value of X. This is the effect plotted in FIG. 1C where the positive going trend of the X voltage is readily seen. The actual slope of the curve of FIG. 1C, although it is important to the success of an actual curve following apparatus, is not of material significance in the instant qualitative analysis. If one analyzes the movement of the tracing beam, he will perceive that the diameter of the unattenuated circle is 2a, while that of the attenuated beam is 2b. Therefore, for each 360° of beam time, the beam will advance along any straight pattern by the difference between the two diameters vis 2a−2b. If, as in the example chosen, the traced line inclines at 45° then the difference in the X displacement for each beam cycle is 2(a−b) cos β, where β is the angle between the line and the positive X axis. The change in Y displacement is accordingly 2(a−b) sin β. Since at 45°, the sine and cosine are equal, the change in the X and Y displacements are equal. It would follow, therefore, that the Y displacement curve should have the same slope as the X curve.

Figure 1F:
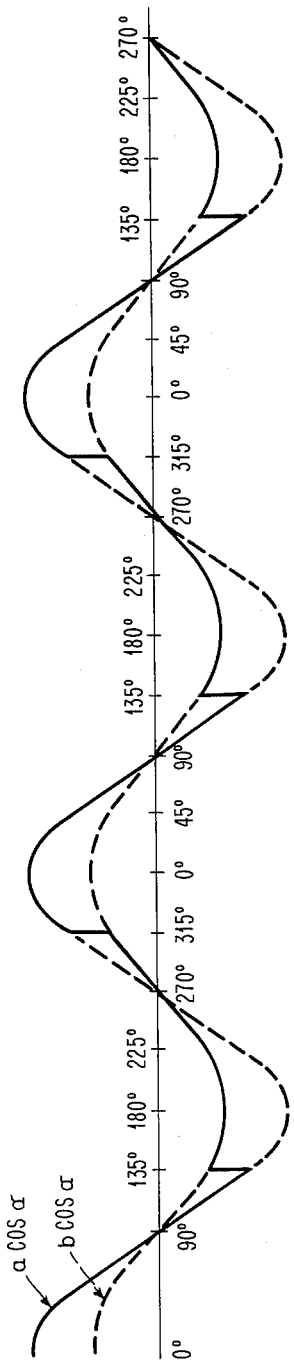
Figure 1G:
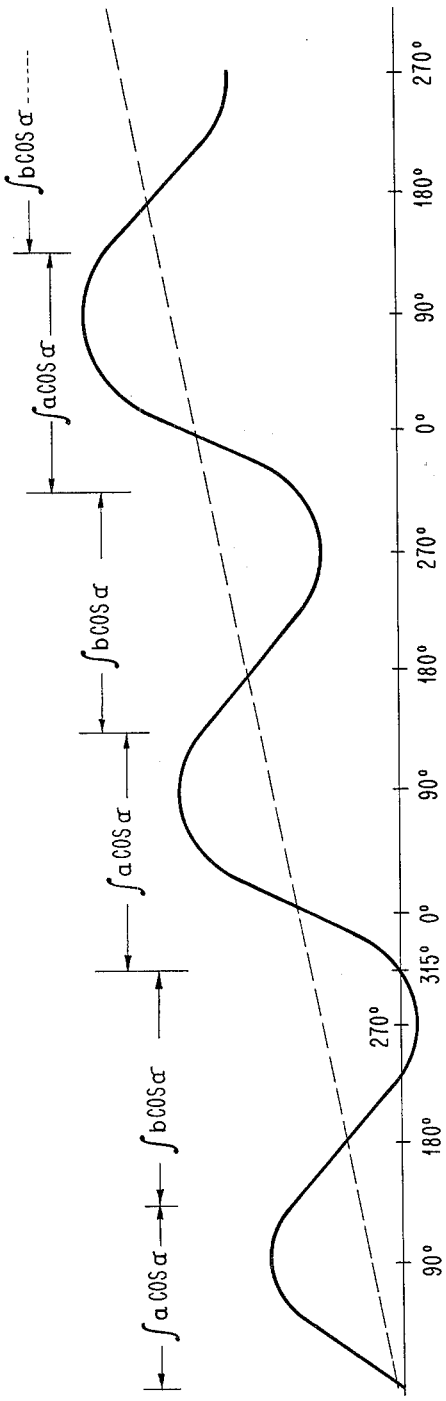

FIG. 1F represents the inputs to the Y integrator 18 (FIG. 1), and employs the same dotted and solid conventions employed with respect to FIG. 1B. FIG. 1G represents the integrated output from the Y integrator and consequently the Y displacement of the cathode ray tube beam. It will be noted that the curve of FIG. 1G bears the same general configuration as that of FIG. 1C, and the slope of the line 100 is the same as that of the line 101 (FIG. 1C) these lines representing the movement of the center of the scanning circle.

That the scanning paths are circular in nature at each instant can be determined from a cross correlation between FIG. 1C and FIG. 1F. At any time the beam will be controlled by either −a cos α and a sin α or −b cos α and b sin α, because of the simultaneous attenuation and de-attenuation of both source waveforms. The movement of the beam along the scanned pattern is set forth by the cited equation and is a function of relative amplitudes of the two waveforms. If a were to equal b, then there would be no migration, as the beam could continuously trace a circle of fixed diameter. If b equalled zero, then there would be no small diameter trace, and the beam would trace a series of tangentially disposed large semi-circles with a beam dwell of 180° corresponding to the time that the beam would have been tracing the small circle. Between these limits (where a−b=a and a−b=0), lies an optimum choice which will be further discussed with respect to the actual circuit embodiment.

Figure 1H:
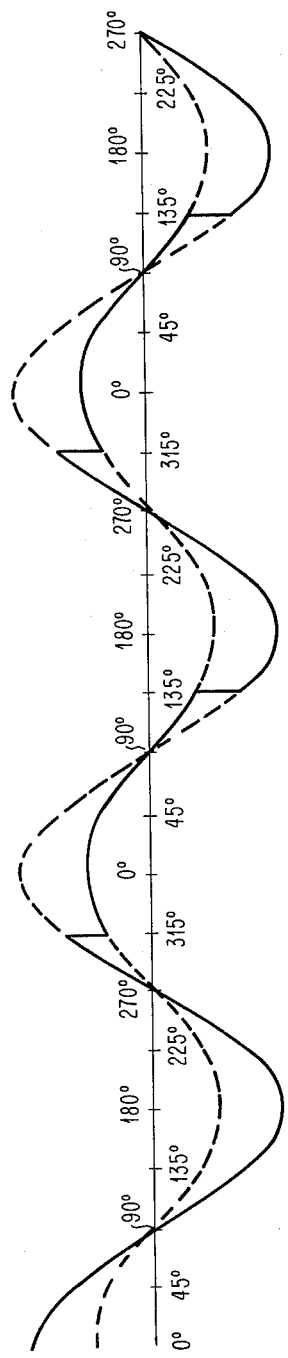
Figure 1I:
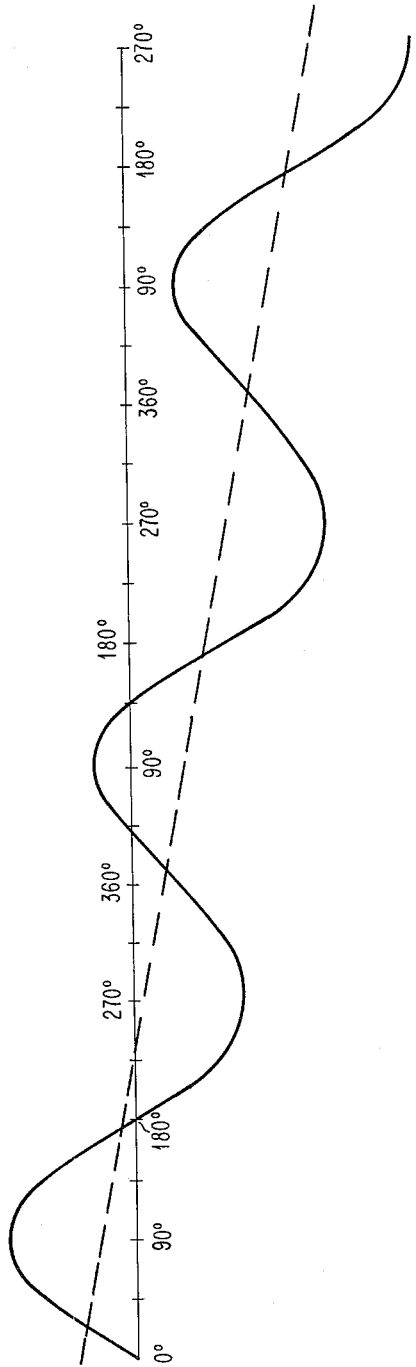

A final study meriting passing attention is the condition wherein the scanning beam encounters the line end 31a and begins following the lower edge of the line 31. When the large circular scan passes beyond the line end, it will not register a line hit until 315° of beam time to effect switching to the small circle. This action is shown by solid lines for the first 315° of cycle time in both FIGS. 1D and 1H. During this time interval, the X and Y displacement undergoes no gross movement, as will be seen by comparison of the displacement curves of FIG. 1E and FIG. 1I. However, when the switch to the attenuated waveforms begins at 315°, the integrators begin to lose their voltages accumulated during the positive-going trace and produce outputs represented in FIG. 1E and 1I. These curves, as might be expected, have negative slopes 102 and 103 which are equal in magnitude to the positive slopes 100 and 101 in FIG. 1C and FIG. 1G. These negative slopes of the displacement curves represent the gross movement of the beam downward and to the left, as both the X and Y displacements decrease. This scanning action continues until the lower line end is reached when the switching times will revert to the original condition.

Although the action in following a straight line inclined at 45° has been examined in considerable detail, it should be apparent that inside curves, outside curves, inside corners, and outside corners can equally well be traced. The rate of advance and the resulting resolution of the following action as well as the accuracy with which the beam traces the line pattern can be controlled by adjustment of the relative size of the scanning circles as well as the absolute size of the larger scanning circle. For example, if the rate of advance is too rapid and the resolution is too coarse, the scanning circle could bridge the re-entrant angles at the sides of a FIGURE 8 and mislead the recognition circuits into recognizing it as the figure 0. Since, as has been explained, a fine resolution necessarily results in a lower migration velocity, it follows that the time to scan a given character increases with the resolution. Therefore, a greater rate of advance with coarser resolution is advantageously employed, with a further additional scan to resolve any difficulties of identification.

In the previous explanation, there was cited the extreme condition when the amplitude ($b$) of the attenuated input waveforms was equal to zero, and the scanning beam traced a series of tangentially disposed semi-circles with 180° of dwell time, the dwell time occurring while the beam was following a small circle of zero radius. A further circuit for accomplishing this same trace pattern is shown in FIG. 2. Here, as in FIG. 1, two sources of waveforms are alternately connected to the X and Y integrators, the proportions of each being controlled by impingement of the scanning beam on the character being scanned. Instead of two different amplitudes of waveforms (as in FIG. 1), the embodiment of FIG. 2 employs positive and negative sine and cosine generators 40, 41, 42, and 43, phased by a common oscillator 44, each producing waveforms of the same amplitude but having the phase relationships denoted by the trigonometric labels. The sine wave functions are connected through a transfer circuit to the X integrator 44, while the cosine wave functions are connected to the Y integrator 45 through a similar transfer circuit, which circuit has been shown schematically as the transfer contacts 46a and 46b of a relay 46, although the electronic equivalent thereof would obviously be employed. The transfer circuit effects the alternate connection of the positive and negative waveforms to the respective integrators whenever, in contradistinction to the apparatus of FIG. 1, the beam intersects the line being traced. The functional link is shown in FIG. 2 through the connection of the photo multiplier tube 47 to the complementing trigger 48, the tube 47 viewing the pattern 50 as it is illuminated by the scanning beam from cathode ray tube 51. Again, as in FIG. 1, details such as amplifiers, clippers, etc., have been intentionally omitted so as not to obscure the broader functional operation of the apparatus during the simple follow mode. The pulse length reset unit (48a) is required for stable operation when the follow mode is initiated and will be explained later.

Since a positive sine wave is applied to the X integrator simultaneously with the application of a positive cosine waveform to the Y integrator the respective outputs will be $-\cos \alpha$ to the X deflection circuits and $+\sin \alpha$ to the Y deflection circuits as in the FIG. 1 embodiment. This results in a clockwise beam rotation from the negative X axis as a reference. When the beam hits the line being traced and the switch to the negative waveforms occurs, the beam velocity vector switches 180° and the beam reverses, but continues in a clockwise rotational direction. This alternate control of the tracing beam produces a trace such as that shown in FIG. 2A where the odd-numbered cusps 61, 63, 65 . . . 71 are controlled by the positive waveforms, and the even-numbered cusps 62, 64, 66 . . . 70 are controlled by the negative waveforms. Were one to construct for this latter circuit arrangement the waveform analysis such as that in FIGS. 1B through 1I, the parallelism in the mode of operation would be apparent. Just as in the first embodiment, the second embodiment may have different amplitudes in the positive and negative waveforms. If one of the waveforms (the negative for example) had its amplitude reduced to zero, then the follower action would be identical to the first embodiment when the amplitude of its small circle was reduced to zero.

Figure 2A:
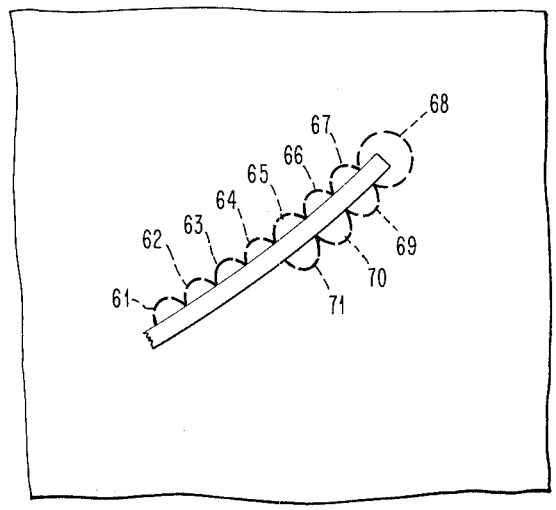
FIG. 2A is a typical trace of the beam controlled by the apparatus of FIG. 2.

In the case shown in FIG. 2A, the centers of the scanning circle were always near the edge of line and stable following occured if the center of the circle is away from the line edge and the beam is almost parallel to the line edge when it hits, as it might be when following is initiated, the next beam hit will cause the beam motion to have a large component normal to the line edge, and the center of the next circle could occur too deep within the line for efficient following along the line edge. To accommodate this condition, the pulse length reset (48a) is used to reset the complementing trigger 48 whenever the duration of the black signal exceeds a fixed limit approximately equal to 60°. Thus, whenever a tangent, or near tangent, hit has occurred and the center of the circle moves deep into the line, the long black pulse that will then come from the photo multiplier tube because the beam stays within the line, will cause the pulse length reset unit 48a to operate the complementing trigger 48 approximately 60° after the near tangent hit was made. The operation of trigger 48 at this time causes the center of the next circle to move (at an angle of approximately 30°) towards the line edge. This motion puts the center very near the line edge, where stable following can proceed as previously described.

The functions hereinabove described with respect to the simplified functional diagram of FIG. 1 and analyzed graphically in FIGS. 1B through 1I are preferably performed by electronic circuitry (as previously stated), such as that shown in FIG. 3. Here, as in FIG. 1, the cathode ray tube 210 produces a controlled illuminated spot on the face of the tube, which spot is imaged through the lens 211 on the surface of the document 213 containing the characters to be followed and identified. One such character is shown and identified as 213a. The document 213 is contained in a light tight chamber and receives illumination solely from the cathode ray tube imaged spot. Thus, light reflected from the document 213 into the photomultiplier tube 214 will decrease and increase in intensity as the imaged spot passes into and out of the character. This difference in light intensity is amplified in the amplifier 216, the output from which controls the clipper 217 to yield a constant amplitude output response of fixed time duration only upon a change in the reflected light from light to dark. This change necessarily connotes that the imaged spot has passed from a white background area into the black of a character, and will be hereafter referred to as a hit.

The position of the beam on the face of the cathode ray tube 210 is controlled by conventional deflection plates or a magnetic yoke from the voltages generated by the summing amplifiers 208 and 209. These amplifiers have search potentials applied to the terminals 208a and 209a by means, not shown, to initially position the tracing beam in close proximity to the character so as to enable the curve following to proceed. These search potentials might, for example, be generated by a pair of sawtooth waveform generators, whose phased outputs will produce a raster scan. Alternatively, the potentials could be supplied by manually controlled potentiometers to position the beam. As the search operation forms no part of this invention, the summing amplifiers 208 and 207 are added solely for the purpose of teaching where and how the search potentials could be introduced. In the curve following operation, the voltages applied to the terminals 208a and 209a are assumed to be fixed, and therefore, the amplifiers 208 and 209 act merely as conventional power amplifiers.

The animation of the cathode ray tube beam originates in the oscillator 200 which produces a sinusoidal output waveform of substantially constant frequency. This sinusoidal output is phase shifted 10° positively in the phase shifter 201 and 100° positively in the phase shifter 202. The output waveforms from the phase shifters, therefore, differ by 90° in phase, and, therefore, define sine and cosine waveforms. Arbitrarily, therefore, the output from phase shifter 202 shall be referred to as the sine and that from the phase shifter 201 as the cosine. The two phase shifts with the difference of 90° are employed to obviate the difficulty of achieving an accurate 90° phase shift in a single shift.

The respective sine and cosine waveforms from the attenuators 202 and 201 normally pass through the attenuators 203 and 205 without any change in their amplitude. It is only when these attenuators receive a control potential from single shot 219 that they will attenuate the signals entered therein. The sine and cosine waveforms respectively are integrated in integrators 204 and 206 to yield waveforms respectively of $-\cos \alpha$ and $+\sin \alpha$ as previously explained. Because it is desired that the beam rotate counter-clockwise (contrary to the direction of beam rotation in FIG. 1), the $-\cos \alpha$ waveform is inverted by the inverter 207 to yield $+\cos \alpha$. With $+\cos \alpha$ entered in the summing amplifier 208 and $+\sin \alpha$ into amplifier 209, the cathode ray tube 210 will produce a circular beam trace, the diameter of which is proportional to the amplitude of the basic waveform.

Since the tracing beam has been initially positioned adjacent to the character 213a, the circular beam trace will at some point in its rotation intercept the black of the character. The photomultiplier 214 response, amplified in amplifier 216 will activate clipper 217 to yield an output pulse, passed by AND gate 218 to fire the single shot 219. The single shot 219 has the characteristic that, once it is energized by an enabling pulse, it will produce an output pulse of fixed duration and amplitude, independent of the firing pulse. The single shot 219 is so constructed that its output pulse continues for 180° of beam time. For the duration of the pulse output from the single shot 219 the potential, thus derived, causes the attenuators 203 and 205 to attenuate the respective waveforms entered therein. These attenuators are in effect, adjustable gain amplifiers whose gains are set at two different levels by the presence or absence of the potential set by the pulse output from the single shot 219. The attenuators 203 and 205 when they are activated by single shot 219 produce the small semicircular scan, whose operation was previously analyzed. Upon the cessation of the pulse output from single shot 219 the attenuators return to their initial state to provide the large circular scan, until the next hit is experienced.

Normally, the small semi-circular scan and the power of the lens 211 are of such magnitude that the small semi-circle traces entirely within the black of a character line. However, because of imperfections in print quality and line thickness, the small semi-circular scan may break out of and back into a character line. As a safety measure, therefore, when the pulse from the single shot 219 ceases, its cessation fires single shot 221 whose output, through the inverter 222 removes the enabling potential from AND 218 to prevent a spurious pulse from clipper 217 from prematurely refiring single shot 219. The duration of 30° (with respect to beam time) of the pulse from single shot 221 assures that the beam will exit from the line and resume its large circular trace without danger of refiring the single shot 219.

The additional terminal 218a to AND gate 218 is normally potentialized during the curve follower action to enable the gate to pass the pulses from clipper 217. If this terminal is depotentialized, the clipper pulses will be blocked and the follower action cannot proceed, as the beam will continue to maintain its large circular trace. This terminal 218a provides an effective beam blanking which could not be achieved by grid action on the cathode ray tube 210. Were grid control employed, the photomultiplier tube 215 would be unable to distinguish a ligitimate hit from the black return occasioned by conventional blanking. The hub 218a serves the further useful purpose of providing a controlled current of the follower action at any time. By depotentialization of this terminal, the integrators will be fed sin α and cos α of full amplitude continuously and will, therefore, accumulate no additional charge. The beam will, therefore, dwell with the circular dither of the larger circle. The arresting action of the hub 218a is useful when the beam is to be moved from character to character to prevent premature false following attempts while the beam is passing through one character to the next.

Since the curve follower is primarily designed to yield time variant voltages for analysis by recognition circuits whose purpose it is to identify the character traced, the filters 246 and 247 are provided. These filters receive the voltages produced by the integrators 206 and 204 (through inverter 207) and are tuned to pass only the slowly varying components thereof and ground the alternating current dither signal. The outputs 246a and 247a, therefore, represent the X and Y beam displacements as a function of time, and in fact, if connected to an oscilloscope, will produce a display which is visually recognizable as the character traced. It is these time variant X and Y voltages that are analyzed to achieve the recognition.

As was stated, the resolution of the scanning circles is proportioned to the size of the character. In the circuits of FIG. 3, this adjustment is shown schematically by the box 250 which feeds the oscillator 200. Although no details are shown, it is sufficient to understand that the curve follower performs a first pass around the character, during which time the maximum voltage excursions occurring at the terminal 247a are stored as $+V_y$ max. and $-V_y$ max. The difference of these voltages is a measure of the character height. Since large characters require less resolution a large difference between the two maximum voltages will produce an increase in the amplitude of the output waveform from the oscillator 200, and a small difference a lesser amplitude waveform. This amplitude adjustment of the oscillator 200 occurs at the end of the first pass around the character and is effective for all subsequent passes.

While none of the fully automatic controls for sequencing the operations necessary for a fully automated page reader has been shown in FIG. 3, it should be apparent that with the ability to move the beam in gross through the application of suitable potentials to the terminals 208a and 209a, and the capability of detecting a change from white to black through the clipper 217 output, that the cathode ray tube beam may be positioned anywhere upon its face by conventional raster scan circutis and that during this scan the first interception with a black area can be detected to cease the search and initiate the follower action. Since the integrated output from the integrators, when they receive unchanging sine and cosine waveforms as inputs, will always be zero over any integral number of cycles, the X and Y beam displacements, when referenced to the integrator outputs will be zero when the beam is being moved solely by search potentials applied to the summing amplifiers. Therefore, when following begins with X and Y (from the integrators) at zero, the next time that these displacements attain zero will mean that the beam has made a complete circuit of the character. Thus, with the circuits shown, the basic signals are generated and controls provided to permit the expansion of the apparatus for fully automated control. As the invention is confined solely to the novel servo type control of the beam position to permit it to follow a line pattern and generate time variant voltages manifestive of the shape of the pattern, the extrapolation of these circuits for automatic controls, as forming no part of the instant invention have been intentionally eliminated so as not to obscure the simplicity of the servo circuits.

While the invention has been particularly shown and described with reference to preferred embodiments thereof, it will be understood by those skilled in the art that various changes in form and details may be made therein without departing from the spirit and scope of the invention.

What is claimed is:

1. An electronic servo apparatus for following the contour of a line pattern comprising:
    (a) a flying spot scanner for imaging an illuminated spot on a surface containing the line pattern, and operative responsive to the respective magnitudes of at least two applied control potentials to position the image on the surface to encompass an area which includes the pattern;
    (b) a generator for producing an electrical signal having a sinusoidal waveform;
    (c) means connected to said generator for producing two sinusoidally varying electrical waveforms respectively displaced from one another by one quarter wavelength;
    (d) a plurality of attenuating devices respectively connected to receive each of the quarter wavelength phase displaced sinusoidal waveforms, each device being operative responsive to the presence of an electrical control signal to attenuate the signal connected thereto, and in the absence of the control signal to pass the signal connected thereto without attenuation;
    (e) an integrating device connected to each of said attenuating devices and to said flying spot scanner to supply the control potentials thereto;
    (f) a light responsive device operative responsive to the change in the illumination intensity as said imaged spot of light moves into said line to produce a potential output response manifestive of the change;
    (g) and means connected to said light responsive device and to said attenuators, operative responsive to the potential output response of said light responsive device to produce an electrical control signal having a fixed duration substantially not greater than one half the period of said sinusoidal waveform, the said electrical signal being operative to cause said attenuators to attenuate the instantaneous amplitudes of the sinusoidal waveforms entered therein.

2. The electronic servo of claim 1 wherein:
    (a) said flying spot scanner comprises a cathode ray tube having horizontal and vertical deflection circuits for positioning the electron beam within the tube, and a lens for imaging the fluorescent spot produced by the electron beam on the face of the tube on the surface containing the said line pattern.

3. The electronic servo apparatus of claim 1 wherein:
    (a) said attenuation devices comprise controllable gain amplifiers, operative responsive to an applied potential of a predetermined magnitude to reduce their gain by a given amount.

4. The electronic servo apparatus of claim 1 wherein:
    (a) said means connected to said light responsive device for producing an electrical control potential having a duration substantially equal to one half the period of said sinusoidal waveform comprises a single shot multivibrator device operative responsive to an applied control pulse to produce an output pulse of constant amplitude and duration for each control applied at a time when the multivibrator is quiescent.

5. An electronic servo system for following the contour of a line pattern comprising:
    (a) a first source of sinusoidally varying electrical waveforms;
    (b) a second source of sinusoidally varying electrical waveforms having the same frequency and phase as the waveform produced by said first source, and differing therefrom in amplitude;
    (c) a third source of sinusoidally varying electrical waveforms having the same frequency and amplitude as the waveform produced by said first source, and displaced in phase therefrom by one quarter wavelength;
    (d) a fourth source of sinusoidally varying electrical waveforms having the same frequency and phase as the waveforms produced by said third source and differing therefrom in amplitude, the amplitude being equal to that of the waveform produced by said second source;
    (e) a first and a second integrator;
    (f) selecting means for selectively connecting said first integrator to said first and second sources of waveforms and said second integrator respectively to said third and fourth sources of waveforms;
    (g) a flying spot scanner for imaging an illustrated spot on a surface containing the line pattern, and operative responsive to the respective magnitudes of at least two applied control potentials to position the image on the surface to encompass an area which includes the line pattern, the said scanner being connected to said first and second integrators;
    (h) means responsive to the change in illumination intensity as said imaged spot of light moves into said line pattern for producing a control response having a duration equal to one half the period of said waveforms,
    (i) and means connecting said last named means to said selecting means for causing its operation to connect said first integrator to second source and said second integrator to said fourth source of waveforms.

6. An electronic servo for following the contour of a line pattern comprising:
    (a) a first sinusoidal electrical waveform generator;
    (b) a second sinusoidal electrical waveform generator having the same frequency as said first generator but producing a waveform displaced by one half wavelength from that produced by said first generator;
    (c) a third sinusoidal electrical waveform generator having the same frequency as said first generator but producing a waveform displaced by one-quarter wavelength from that produced by said first generator;
    (d) a fourth sinusoidal electrical waveform generator having the same frequency as said third waveform generator but producing a waveform displaced by one-half wavelength from that produced by said third generator;
    (e) a first and a second integrator;
    (f) selecting means for alternately connecting said first integrator to said first and to second sources of waveforms and said second integrator respectively to said third and fourth sources of waveforms;
    (g) a flying spot scaner for imaging an illuminated spot on a surface containing the line pattern, and operative responsive to the respective magnitudes of at least two applied control potentials to position the image on the surface to encompass an area which includes the line pattern, the said scanner being connected to said first and second integrators;

(h) a light responsive device operative responsive to the change in the illumination intensity as said imaged spot of light moves into said line to produce a potential output response manifestive of the change, (i) and means connecting last named means and said selecting means for causing said selecting means to effect the alternate connections in response to each output response of said last-named means.

7. An electronic servo system for following the contour of a line pattern comprising:
   (a) a flying spot scanner for imaging an illuminated spot upon a surface containing the line pattern, and operative responsive to the respective magnitudes of at least two applied control potentials to controllably position the illuminated spot within an area containing the line pattern;
   (b) a first and a second integrating device each having an input terminal and an output terminal, the output terminals being connected to said flying spot scanner to supply the respective control potentials thereto, each device being operative to produce an output potential which is the integral with respect to time of the potential signal applied to the input terminal;
   (c) a first generator for producing a first sinusoidally varying electrical waveform having a constant frequency and amplitude;
   (d) a second generator for producing a second sinusoidally varying electrical waveform having the same frequency and phase as said first waveform but having an amplitude which bears a predetermined fractional relationship to the amplitude of said first waveform;
   (e) a third generator for producing a third sinusoidally varying electrical waveform having the same frequency and amplitude as said first waveform, and having a predetermined phase relationship thereto;
   (f) a fourth generator for producing a fourth sinusoidally varying electrical waveform having the same frequency and phase as said third waveform, and having an amplitude equal to the amplitude of said second waveform;
   (g) light responsive means for detecting the changes in illumination, as said illuminated spot enters and exits from said line pattern under the positional control of the potentials applied to said flying spot scanner,
   (h) and means under the control of said light responsive means for effecting the alternate connection of the input terminal of said first integrator to said first and said second generators simultaneously with the alternate respective connection of the input terminal of said second integrator to said third and fourth generators.

8. A servo apparatus for following the edge of a pattern, comprising:
   (a) means for imaging a radiant spot upon the pattern;
   (b) means for alternately animating the said spot in two continuously joined circular paths having two different respective radii;
   (c) radiation responsive means for detecting the interception of the edge of said pattern by the said spot; and
   (d) means under control of said radiation responsive means for controlling the alternation between the said two circular paths.

9. The apparatus of claim 8 wherein said means under control of said radiation responsive means for controlling the alternation between the said two circular paths controls the animation at the lesser radius for a predetermined invariable duration and at a predetermined interval of time following the interception of the edge of said pattern by the said spot.

References Cited by the Examiner

UNITED STATES PATENTS 2,974,254    3/1961    Fitzmaurice et al. ___ 250—202 X
2,986,643    5/1961    Brouillette _____ 250—202

RALPH G. NILSON, *Primary Examiner.*

WALTER STOLWEIN, *Examiner.*